Patented Nov. 5, 1935

2,020,051

UNITED STATES PATENT OFFICE 2,020,051

PROCESS FOR THE PRODUCTION OF FUROYL SUBSTITUTED MERCAPTOBENZOTHIAZOLES

Sylvester M. Evans, Nitro, W. Va., assignor to The Rubber Service Laboratories Company, Akron, Ohio, a corporation of Ohio No Drawing. Application January 5, 1933,
Serial No. 650,309

7 Claims. (Cl. 260—44)

The present invention relates to the art of rubber manufacture and particularly relates to a new class of rubber vulcanization accelerators for use in the vulcanization of rubber or rubber like products.

The new and preferred class of rubber vulcanization accelerators comprise the reaction product of a mercaptothiazole and an acid halide of the furane series which are preferably employed in conjunction with basic activating accelerators.

For example, the following reaction products are typical members of the new and preferred class of materials outlined above: reaction product of furoyl chloride possessing the structural formula of $$\begin{array}{c} HC\!\!-\!\!-\!\!-\!\!CH \\ \| \quad\quad \| \\ HC \quad\quad C\!\!-\!\!COCl \\ \diagdown\!\!O\!\!\diagup \end{array}$$

and mercaptobenzothiazole; reaction product of furoyl chloride and mercaptonaphthothiazole; reaction product of furoyl chloride and mercaptotolylthiazole; reaction product of 2,5 diphenyl furan (3) carboxylic acid chloride possessing the chemical formula of $$\begin{array}{c} HC\!\!-\!\!-\!\!-\!\!C\!\!-\!\!COCl \\ \| \quad\quad \| \\ C_6H_5C \quad\quad C\!\!-\!\!C_6H_5 \\ \diagdown\!\!O\!\!\diagup \end{array}$$

and mercaptobenzothiazole; reaction product of 2-methyl furan (5) carboxylic acid chloride possessing the structural formula of $$\begin{array}{c} HC\!\!-\!\!-\!\!-\!\!CH \\ \| \quad\quad \| \\ CH_3\!\!-\!\!C \quad\quad C\!\!-\!\!COCl \\ \diagdown\!\!O\!\!\diagup \end{array}$$

and mercaptobenzothiazole; reaction product of 2,5-dimethyl furan (3) carboxylic acid chloride possessing the structural formula of $$\begin{array}{c} ClOC\!\!-\!\!C\!\!-\!\!-\!\!-\!\!CH \\ \| \quad\quad \| \\ CH_3\!\!-\!\!C \quad\quad C\!\!-\!\!CH_3 \\ \diagdown\!\!O\!\!\diagup \end{array}$$

and mercaptotolylthiazole; reaction product of 2,4-dimethyl furan (3) carboxylic acid chloride possessing the structural formula $$\begin{array}{c} CH_3\!\!-\!\!C\!\!-\!\!-\!\!-\!\!C\!\!-\!\!COCl \\ \| \quad\quad \| \\ HC \quad\quad C\!\!-\!\!CH_3 \\ \diagdown\!\!O\!\!\diagup \end{array}$$

and mercaptonaphthothiazole; reaction product of 2-methyl-5-phenyl furan (3) carboxylic acid bromide possessing the structural formula of $$\begin{array}{c} BrOC\!\!-\!\!C\!\!-\!\!-\!\!-\!\!CH \\ \| \quad\quad \| \\ CH_3\!\!-\!\!C \quad\quad C\!\!-\!\!C_6H_5 \\ \diagdown\!\!O\!\!\diagup \end{array}$$

and mercaptobenzothiazole; reaction product of 2,5-dimethyl furan (3,4) dicarboxylic acid chloride having a structural formula of $$\begin{array}{c} ClOC\!\!-\!\!C\!\!-\!\!-\!\!-\!\!C\!\!-\!\!COCl \\ \| \quad\quad \| \\ CH_3\!\!-\!\!C \quad\quad C\!\!-\!\!CH_3 \\ \diagdown\!\!O\!\!\diagup \end{array}$$

and mercaptobenzothiazole; reaction product of 6-methyl-2 mercaptobenzothiazole and furoyl chloride; reaction product of 6-nitro-2-mercaptobenzothiazole and furoyl chloride.

The following are to be understood as illustrative embodiments of the invention and not limitative of the scope thereof.

EXAMPLE I

Substantially 0.2 mols of mercaptobenzothiazole (33.4 parts) and 0.2 mols of sodium hydroxide (8.0 parts) were dissolved in substantially 400 parts of water. To the aqueous solution of the sodium salt of mercaptobenzothiazole thus produced there were added with rapid agitation substantially 0.2 mols of furoyl chloride (26.1 parts) dissolved in a small quantity of a suitable solvent, for example substantially 15 to 20 parts by weight of benzene, at a temperature of substantially 10 to 15° C. As the reaction took place, a fine white precipitate was formed. When the addition of the furoyl chloride was completed, substantially 200 parts by weight of a dilute alkaline solution, for example a 10 percent aqueous sodium carbonate solution, was added to the reaction mixture and agitation continued for substantially one hour. The precipitated material was filtered off, washed free of alkali and after drying, a substantially theoretical yield of a white powder free from unreacted mercaptobenzothiazole and melting at substantially 140 to 143° C. was obtained.

It is believed the above reaction takes place in the following manner:

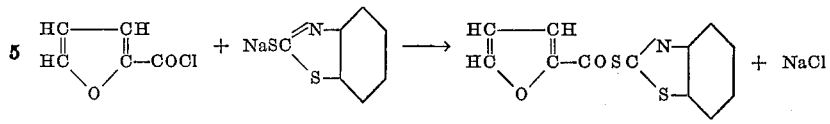

The reaction product of furoyl chloride and the sodium salt of mercaptobenzothiazole prepared in the manner described was incorporated in a typical rubber gum stock comprising

| | Parts |
|---|---|
| Pale crepe rubber | 100 |
| Zinc oxide | 5 |
| Sulfur | 3 |
| Stearic acid | 1 |
| Reaction product of furoyl chloride and the sodium salt of mercaptobenzothiazole | 0.2 |
| Diphenyl guanidine | 0.8 |

The rubber stock thus compounded was vulcanized in the usual manner and the cured rubber product tested with the result given in Table I.

Table I

| Cure | | Modulus of elasticity in lbs./in.² at elongations of | | | Tensile at break in lbs./in.² | Ult. elong. % |
|---|---|---|---|---|---|---|
| Mins. | Lbs. steam pressure | 300% | 500% | 700% | | |
| 30 | 30 | 155 | 318 | 1,095 | 3,005 | 880 |
| 45 | 30 | 238 | 442 | 1,655 | 3,295 | 830 |
| 60 | 30 | 244 | 512 | 1,925 | 3,850 | 830 |

From the data set forth in Table I it is readily apparent that the preferred class of materials has desirable accelerating properties.

The compounded stock hereinbefore set forth showed no "set up" or prevulcanization, as determined on an apparatus known as the Williams Plastometer described by Williams, Industrial and Engineering Chemistry for 1924 (vol. 16, page 362—see also Krall, ibid. vol. 16, page 922) on heating for 180 minutes at 200° F. The value of the preferred class of materials from an anti-scorching standpoint is thus readily apparent.

A rubber stock was also compounded identical with that given above with the exception that one percent of the reaction product of furoyl chloride and the sodium salt of mercaptobenzothiazole was employed as the accelerator in the absence of a basic organic nitrogen containing accelerator. Tests on the cured rubber product showed that the reaction product of furoyl chloride and the sodium salt of mercaptobenzothiazole, when employed in the absence of a basic organic nitrogen containing accelerator, possesses desirable accelerating properties.

The reaction product of furoyl chloride and mercaptobenzothiazole, for example the sodium salt thereof, was employed in a so called white stock comprising

| | Parts |
|---|---|
| Pale crepe rubber | 100 |
| Zinc oxide | 60 |
| Lithopone | 20 |
| Sulfur | 2 |
| Paraffin | 0.25 |
| The reaction product of furoyl chloride and the sodium salt of mercaptobenzothiazole | 0.70 |
| Diphenyl guanidine | 0.3 |

The stock thus compounded after vulcanization gave the following modulus and tensile figures.

Table II

| Cure | | Modulus of elasticity in lbs./in.² at elongations of | | Tensile at break in lbs./in.² | Ult. elong. % |
|---|---|---|---|---|---|
| Mins. | Lbs. steam pressure | 300% | 500% | | |
| 30 | 30 | 381 | 1,128 | 2,665 | 690 |
| 45 | 30 | 473 | 1,378 | 3,170 | 690 |

Portions of the white rubber stock cured as described, on exposing to ultra violet light rays generated by a mercury arc light positioned nine inches from the cured rubber stocks, were found, after eighteen hours exposure thereto, to have undergone substantially no change in color, thus demonstrating another of the desirable qualities of the new class of accelerators.

The reaction product of furoyl chloride and mercaptobenzothiazole, for example the sodium salt thereof, was also employed in a rubber tread stock. Thus a stock was compounded comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Reaction product of furoyl chloride and the sodium salt of mercaptobenzothiazole | 0.8 |
| Diphenyl guanidine | 0.2 |

The rubber stock thus compounded was cured and the vulcanized rubber product tested with the result given in the following table.

Table III

| Cure | | Modulus of elasticity in lbs./in.² at elongations of | | Tensile at break in lbs./in.² | Ultimate elongation % |
|---|---|---|---|---|---|
| Mins. | Lbs. steam pressure | 300% | 500% | | |
| 60 | 30 | 1,920 | 4,025 | 4,380 | 530 |
| 75 | 30 | 2,060 | 4,245 | 4,315 | 505 |
| 90 | 30 | 2,270 | 4,530 | 4,530 | 500 |

Example II

The reaction product of substantially equimolecular proportions of the sodium salt of 6-methyl-2-mercaptobenzothiazole and furoyl chloride was prepared in a manner analogous to that employed in the manufacture of Example I. The product thus obtained was incorporated in a stock comprising

| | Parts |
|---|---|
| Pale crepe rubber | 100 |
| Zinc oxide | 5 |
| Sulfur | 3 |
| Stearic acid | 1 |
| The reaction product of the sodium salt of 6-methyl-2-mercaptobenzothiazole and furoyl chloride | 0.8 |
| Diphenyl guanidine | 0.2 |

The stock thus compounded, after vulcanization, on testing gave the following results.

Table IV

| Cure | | Modulus of elasticity in lbs./in.² at elongations of | | | Tensile at break in lbs./in.² | Ult. elong. % |
| --- | --- | --- | --- | --- | --- | --- |
| Mins. | Lbs. steam pressure | 300% | 500% | 700% | | |
| 30 | 30 | 175 | 395 | 1,460 | 2,810 | 820 |
| 45 | 30 | 215 | 531 | 2,015 | 3,040 | 770 |
| 60 | 30 | 523 | 564 | 2,295 | 3,190 | 760 |

EXAMPLE III

The reaction product of substantially equimolecular proportions of the sodium salt of 6-nitro-2-mercaptobenzothiazole and furoyl chloride was prepared in a manner analogous to that employed in making Example I, and incorporated in a rubber stock comprising

|  | Parts |
| --- | --- |
| Pale crepe rubber | 100 |
| Zinc oxide | 5 |
| Sulfur | 3 |
| Stearic acid | 1 |
| The reaction product of the sodium salt of 6-nitro-2-mercaptobenzothiazole and furoyl chloride | 0.8 |
| Diphenyl guanidine | 0.2 |

The stock thus compounded after vulcanization gave the following tensile and modulus data.

Table V

| Cure | | Modulus of elasticity in lbs./in.² at elongations of | | | Tensile at break in lbs./in.² | Ultimate elongation % |
| --- | --- | --- | --- | --- | --- | --- |
| Mins. | Lbs. steam pressure | 300% | 500% | 700% | | |
| 30 | 30 | 242 | 630 | 2,515 | 3,635 | 770 |
| 45 | 30 | 270 | 674 | 2,800 | 3,605 | 750 |
| 60 | 30 | 282 | 750 | 2,915 | 3,535 | 740 |

From the data hereinbefore set forth it has been shown that the new class of vulcanization accelerators possess exceptionally desirable properties when employed in a rubber mix.

Other activating basic organic nitrogen containing accelerators than diphenyl guanidine may be employed in conjunction with the preferred class of accelerators. Thus diortho tolyl guanidine, triphenyl guanidine, hexamethylene tetramine, piperidine, dicyandiamide, the biguanides, the Schiff's bases and aldehyde derivatives thereof may be employed in conjunction with the new and improved class of accelerators as activators thereof.

The present invention is limited solely by the claims attached hereto as a part of the present specification.

What is claimed is:

1. The process of producing a vulcanization accelerator comprising reacting substantially equi-molecular proportions of a furan carboxylic acid halide, said carboxylic acid halide radical being directly attached to a nuclear carbon atom of the furan ring, and a mercaptoarylthiazole at a temperature of substantially 10 to 15° C. in an aqueous medium containing a small proportion of an inert organic solvent immiscible therewith.

2. The process of producing a vulcanization accelerator comprising reacting substantially equi-molecular proportions of a furan carboxylic acid halide, said carboxylic acid halide radical being directly attached to a nuclear carbon atom of the furan ring, and a mercaptobenzothiazole at a temperature of substantially 10 to 15° C. in an aqueous medium containing a small proportion of an inert organic solvent immiscible therewith.

3. The process of producing a vulcanization accelerator comprising reacting substantially equi-molecular proportions of a furoyl chloride and a mercaptobenzothiazole at a temperature of substantially 10 to 15° C. in water containing a small amount of benzene.

4. The process of producing a vulcanization accelerator comprising reacting substantially equi-molecular proportions of furoyl chloride and the sodium salt of mercaptobenzothiazole at a temperature of substantially 10 to 15° C. in water containing a small proportion of benzene.

5. The process of producing a vulcanization accelerator comprising reacting substantially equi-molecular proportions of a furan carboxylic acid halide, said carboxylic acid halide radical being directly attached to a nuclear carbon atom of the furan ring, and a mercaptoarylthiazole in an aqueous medium containing a small amount of an inert organic solvent at a temperature below the boiling point but above the freezing point of said solvent.

6. The process of producing a vulcanization accelerator comprising reacting a furan carboxylic acid halide, said carboxylic acid halide radical being directly attached to a nuclear carbon atom the furan ring, and a mercaptoarylthiazole in an aqueous medium containing a small amount of an inert organic solvent at a temperature below the boiling point but above the freezing point of said solvent.

7. The process of producing a vulcanization accelerator comprising reacting a furoyl halide and a mercaptoarylthiazole in an aqueous medium containing a small amount of an inert organic solvent at a temperature below the boiling point but above the freezing point of said solvent.

SYLVESTER M. EVANS.